US012374323B2

(12) United States Patent
Ding et al.

(10) Patent No.: US 12,374,323 B2
(45) Date of Patent: Jul. 29, 2025

(54) 4-BIT CONFORMER WITH ACCURATE QUANTIZATION TRAINING FOR SPEECH RECOGNITION

(71) Applicant: Google LLC, Mountain View, CA (US)

(72) Inventors: Shaojin Ding, Mountain View, CA (US); Oleg Rybakov, Mountain View, CA (US); Phoenix Meadowlark, Mountain View, CA (US); Shivani Agrawal, Mountain View, CA (US); Yanzhang He, Palo Alto, CA (US); Lukasz Lew, Mountain View, CA (US)

(73) Assignee: Google LLC, Mountain View, CA (US)

( * ) Notice: Subject to any disclaimer, the term of this patent is extended or adjusted under 35 U.S.C. 154(b) by 324 days.

(21) Appl. No.: 18/186,774

(22) Filed: Mar. 20, 2023

(65) Prior Publication Data

US 2023/0298569 A1 Sep. 21, 2023

Related U.S. Application Data

(60) Provisional application No. 63/269,705, filed on Mar. 21, 2022.

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01)

(58) Field of Classification Search
CPC ............................... G10L 15/063; G10L 15/16
See application file for complete search history.

(56) References Cited

U.S. PATENT DOCUMENTS 11,132,988 B1 * 9/2021 Steedman Henderson ............. G10L 15/22
2020/0380215 A1 * 12/2020 Kannan ............ G10L 15/005

FOREIGN PATENT DOCUMENTS

WO 2021258752 A1 12/2021

OTHER PUBLICATIONS

International Search Report and Written Opinion (EPO) for Application No. PCT/US2023/015695 dated May 23, 2023.

(Continued)

*Primary Examiner* — Ibrahim Siddo
(74) *Attorney, Agent, or Firm* — Honigman LLP; Brett A. Krueger; Grant Griffith

(57) ABSTRACT

A method for training a model includes obtaining a plurality of training samples. Each respective training sample of the plurality of training samples includes a respective speech utterance and a respective textual utterance representing a transcription of the respective speech utterance. The method includes training, using quantization aware training with native integer operations, an automatic speech recognition (ASR) model on the plurality of training samples. The method also includes quantizing the trained ASR model to an integer target fixed-bit width. The quantized trained ASR model includes a plurality of weights. Each weight of the plurality of weights includes an integer with the target fixed-bit width. The method includes providing the quantized trained ASR model to a user device.

20 Claims, 7 Drawing Sheets

(56) References Cited

OTHER PUBLICATIONS

Andrea Fasoli et al: "4-bit Quantization of LSTM-based Speech Recognition Models", arxiv.org, Cornell University Library, 201 Olin Library Cornell University Ithaca, NY 14853, Aug. 27, 2021 (Aug. 27, 2021), XP091040290.
Shaojin Ding et al: "4-bit Conformer with Native Quantization Aware Training for Speech Recognition", arxiv.org, Cornell University Library, 201 Olin Library Cornell University Ithaca, NY 14853, Mar. 29, 2022 (Mar. 29, 2022), XP091186775.
Anmol Gulati et al: "Conformer: Convolution-augmented Transformer for Speech Recognition", arxiv.org, Cornell University Library, 201 Olin Library Cornell University Ithaca, NY 14853, May 16, 2020 (May 16, 2020), XP081674848.
Niccolvo Nicodemo et al: "Memory Requirement Reduction of Deep Neural Networks Using Low-bit Quantization of Parameters", arxiv.org, Cornell University Library, 201 Olin Library Cornell University Ithaca, NY 14853, Nov. 1, 2019 (Nov. 1, 2019), XP081524395.

* cited by examiner

```
1  def quantize(input, axis):
2    max_val = tf.math.reduce_max(tf.math.abs(
       input), axis=axis, keepdims=True)
3    scale = tf.divide(max_val, 127.0)
4    scale = tf.stop_gradient(scale)
5    scaled_input = tf.math.divide_no_nan(input,
       scale)
6    return tf.cast(
       tf.math.floor(scaled_input + 0.5), tf.
       int8)
```

FIG. 4

4-BIT CONFORMER WITH ACCURATE QUANTIZATION TRAINING FOR SPEECH RECOGNITION

CROSS REFERENCE TO RELATED APPLICATIONS

This U.S. patent application is a continuation of, and claims priority under 35 U.S.C. § 120 from, U.S. Patent Application 63/269,705, filed on Mar. 21, 2022. The disclosure of this prior application is considered part of the disclosure of this application and is hereby incorporated by reference in its entirety.

TECHNICAL FIELD

This disclosure relates to accurate quantization training for speech recognition.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience. However, mobile phones often have limited resources, which limit the size of the ASR model.

SUMMARY

One aspect of the disclosure provides a method for training an automatic speech recognition (ASR) model. The computer-implemented method, when executed on data processing hardware, causes the data processing hardware to perform operations. The operations include obtaining a plurality of training samples. Each respective training sample of the plurality of training samples includes a respective speech utterance and a respective textual utterance representing a transcription of the respective speech utterance. The method includes training, using quantization aware training with native integer operations, an ASR model on the plurality of training samples. The method also includes quantizing the trained ASR model to an integer target fixed-bit width. The quantized trained ASR model includes a plurality of weights. Each weight of the plurality of weights includes an integer with the target fixed-bit width. The method includes providing the quantized trained ASR model to a user device.

Implementations of the disclosure may include one or more of the following optional features. In some implementations, the target fixed-bit width is four. In some examples, the ASR model further includes a plurality of activations and each activation of the plurality of activations may include an integer with the target fixed-bit width. In other examples, the ASR model further includes a plurality of activations and each activation of the plurality of activations includes an integer with a fixed bit width greater than the target fixed-bit width. In yet other examples, the ASR model further includes a plurality of activations and each activation of the plurality of activations includes a float value.

Optionally, quantizing the trained ASR model includes determining a scale factor based on an estimated max value of an axis to be quantized and the target fixed-bit width. In some implementations, the ASR model includes one or more multi-head attention layers. In some of these implementations, the one or more multi-head attention layers include one or more conformer layers or one or more transformer layers. The ASR model may include a plurality of encoders and a plurality of decoders and quantizing the ASR model may include quantizing the plurality of encoders and not quantizing the plurality of decoders. In some examples, the ASR model includes an audio encoder and the audio encoder includes a cascaded encoder includes a first causal encoder and a second non-causal encoder.

Another aspect of the disclosure provides a system for training an ASR model. The system includes data processing hardware and memory hardware in communication with the data processing hardware. The memory hardware stores instructions that when executed on the data processing hardware cause the data processing hardware to perform operations. The operations include obtaining a plurality of training samples. Each respective training sample of the plurality of training samples includes a respective speech utterance and a respective textual utterance representing a transcription of the respective speech utterance. The method includes training, using quantization aware training with native integer operations, an ASR model on the plurality of training samples. The method also includes quantizing the trained ASR model to an integer target fixed-bit width. The quantized trained ASR model includes a plurality of weights. Each weight of the plurality of weights includes an integer with the target fixed-bit width. The method includes providing the quantized trained ASR model to a user device.

This aspect may include one or more of the following optional features. In some implementations, the target fixed-bit width is four. In some examples, the ASR model further includes a plurality of activations and each activation of the plurality of activations may include an integer with the target fixed-bit width. In other examples, the ASR model further includes a plurality of activations and each activation of the plurality of activations includes an integer with a fixed bit width greater than the target fixed-bit width. In yet other examples, the ASR model further includes a plurality of activations and each activation of the plurality of activations includes a float value.

Optionally, quantizing the trained ASR model includes determining a scale factor based on an estimated max value of an axis to be quantized and the target fixed-bit width. In some implementations, the ASR model includes one or more multi-head attention layers. In some of these implementations, the one or more multi-head attention layers include one or more conformer layers or one or more transformer layers. The ASR model may include a plurality of encoders and a plurality of decoders and quantizing the ASR model may include quantizing the plurality of encoders and not quantizing the plurality of decoders. In some examples, the ASR model includes an audio encoder and the audio encoder includes a cascaded encoder includes a first causal encoder and a second non-causal encoder.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a schematic view of a quantization algorithm for quantization aware training with native integer operations.

Like reference symbols in the various drawings indicate like elements.

DETAILED DESCRIPTION

With the fast growth of voice search and speech-interactive features, automatic speech recognition (ASR) has become an essential component for user-interactive services and devices (e.g., search by voice functions in search engines and smartphones). Modern ASR applications are often developed based on an end-to-end model, which has been shown to achieve significant recognition performance improvements compared to conventional hybrid systems with a much smaller model size. Improving latency and model size without compromising recognition quality has been an active pursuit to benefit live ASR applications with both server-side and on-device models.

Quantization is a technique to reduce the computational and memory costs of ASR models by representing the weights and/or activations with lower precision data types (e.g., and 8-bit integer) instead of a conventional 32-bit floating point value. Among modern model quantization methods, post training quantization (PTQ) with 8-bit integers (int8) is a popular and easy to use technique that has been successfully applied in many applications. However, one of the drawbacks of such a technique is the potential performance degradation due to the loss of precision. Another limitation of PTQ is the lack of control over model quantization. For example, PTQ may not support 4-bit integer (int4) quantization or customized quantization of selected set of layers.

Implementations herein include a model trainer that trains an ASR model using native quantization aware training (QAT) with native integer operations. In contrast to some methods that use "fake" QAT (i.e., using float operations and later using a conversion to convert the floats to integers), native QAT uses native integer operations to execute quantized operations (e.g. matrix multiplications) which generates models that do not have any difference in accuracy during training and inference. That is, "fake quantization" can have a numerical difference between training (i.e., with float operations) and inference (i.e., with integer operations) modes when the float operation do not fit into the bits of mantissa during training.

Implementations herein include a model trainer that uses native QAT to train an ASR model. This approach ensures that "what you train is what you serve." That is, with native integer operations, there is no numerical difference between forward propagation of training and inference. Thus, the trained model may be run in multiple applications, such as both in the cloud (e.g., on a tensor processing unit (TPU)) or model applications with the same performance. The model trainer minimizes the number of operations used for quantization to reduce training time in comparison to traditional techniques. The ASR model may include one or more multi-head attention layers, such as one or more conformer layers and/or one or more transformer layers.

Figure 1A:
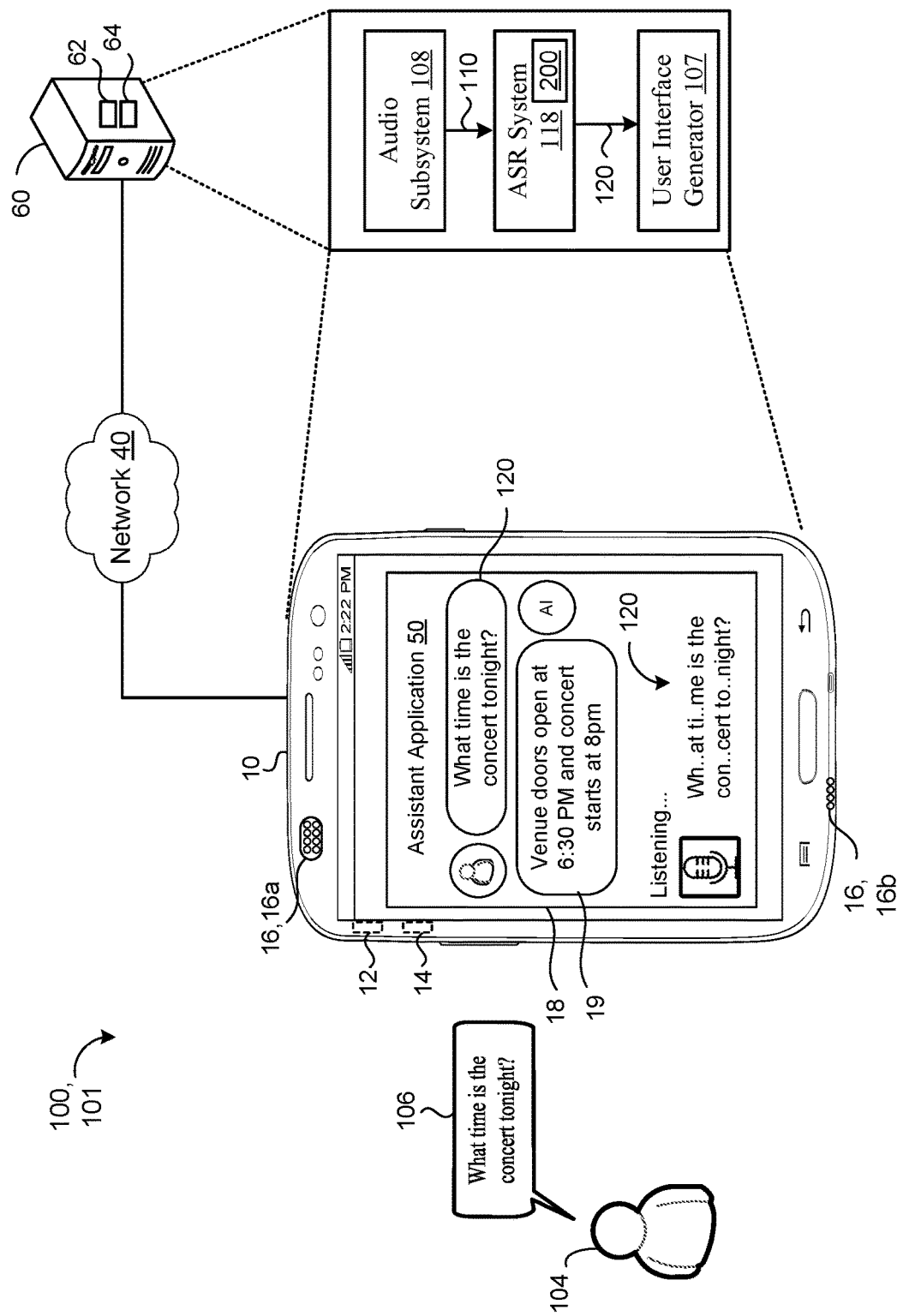
FIG. 1A is a schematic view of an example system for performing speech recognition.

FIG. 1A is an example of a system 100 operating in a speech environment 101. In the speech environment 101, a user's 104 manner of interacting with a computing device, such as a user device 10, may be through voice input. The user device (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 includes a model 200 (such as a recurrent neural network-transducer (RNN-T) model or other conformer transducer model/multi-pass model) that resides on the user device 10 of the user 104 and/or on a remote computing device 60 (e.g., one or more remote servers of a distributed system executing in a cloud-computing environment) in communication with the user device 10 via a network 40. The remote computing device is equipped with data processing hardware 62 and memory hardware 64. The user device and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the model 200 receives, as input, the audio frames 110 (i.e., audio data) corresponding to the utterance 106, and generates/predicts, as output, a corresponding transcription 120 (e.g., speech recognition result/hypothesis) of the utterance 106.

The user device 10 and/or the remote computing device 60 also executes a user interface generator 107 configured to present a representation of the transcription 120 of the utterance 106 to the user 104 of the user device 10. As described in greater detail below, the user interface generator 107 may display the speech recognition results 120 in a streaming fashion. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1A depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Figure 1B:
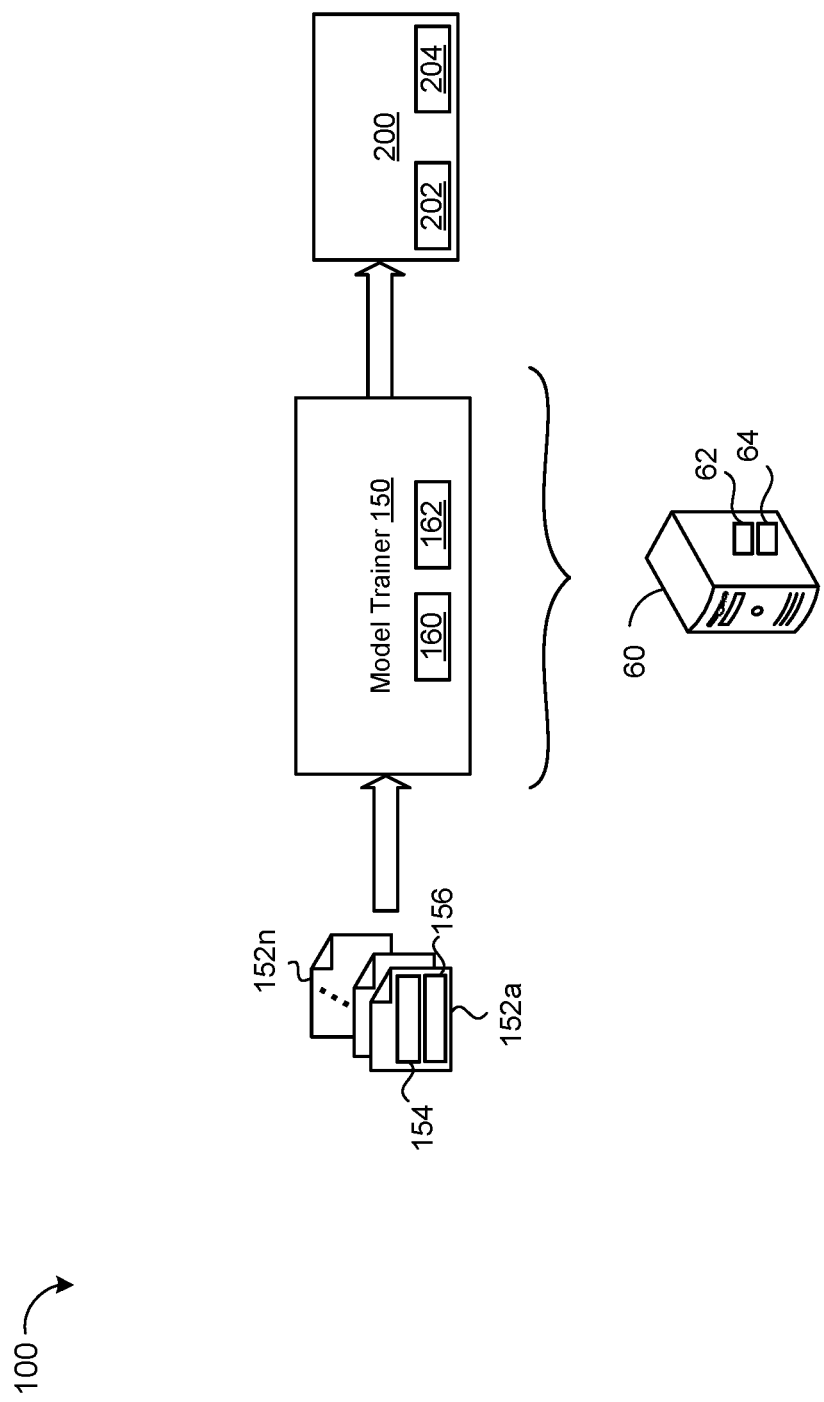
FIG. 1B is a schematic view of components for training an automatic speech recognition (ASR) model for the system of FIG. 1A.

Referring now to FIG. 1B, the remote computing device 60 executes a model trainer 150 to train the model 200 of FIG. 1A. The model trainer 150 obtains a plurality of training samples 152, 152a—n (e.g., from the memory hardware 64). Each training sample 152 includes a spoken training utterance 154 (i.e., a sequence of input audio features) and corresponding textual utterance 156 representing a transcription 156 of the utterance 154. The model trainer 150, using quantization aware training (QAT) with native integer operations, trains the model 200 on the plurality of training samples 152. As discussed in more detail below, the model trainer 150 uses quantization aware training by determining, during training, a scale factor 160. The model trainer 150, during or after training, quantizes the model 200 to an integer fixed-bit width 162. The integer fixed-bit width 162 represents a number of bits allocated to each native integer operation. For example, when the integer fixed-bit width 162 is eight, the model 200 is quantized to 8-bit integers (i.e., int8). In another example, when the integer fixed-bit width 162 is four, the model 200 is quantized to 4-bit integers (i.e., int4). Other examples are possible, such as 6-bit integers. The integer fixed-bit width 162 may be configurable by a user and dependent upon the use case of the model.

Conventional quantization aware techniques rely on "fake" QAT. For example, many common systems quantize models using tf.quantization.fake_quant_*operations. These operations are used during server-side inference, but for on-device models (e.g., user devices such as smart phones and the like), conversion operations (e.g., TFlite) must be used to convert the fake quantization operations into integer operations. Thus, these conventional techniques require this additional conversion step to convert the fake quantization operations to actual integer operations and existing application programming interfaces (APIs) support per-channel min and max value estimations over the last dimension only. This is not ideal, as in some use cases where the channel dimension is not the last dimension. In these cases, the conventional techniques must permute dimensions of the input tensor to make the channel dimension be the last dimension, then "fake" quantize the tensor using the API. Finally, the dimensions must be permuted back to the original order of the input tensor. These additional permutation operations increase training time. In contrast, the model trainer 150 employs native integer operations (e.g., tf operations). As a result, the model 200 may be used for training and inference on both mobile and TPU applications. Moreover, training may be additionally sped up through the use of hardware supported integer operations (e.g., matrix multiplications).

During quantization, the model trainer 150 reduces a size of the model 200 by adjusting a size of one or more weights 202 and/or activations 204 of the model 200. Conventionally, both the weights 202 and activations 204 of ASR models are represented by float32 values, which take up 32 bits of space and often require complex computations to process. In PTQ, these float32 values may be "clipped" or rounded in order to reduce precision and memory requirements. In contrast, the model trainer 150 uses native integer operations to represent the weights 202 of the model 200 using integers of a size determined by the fixed-bit width 162. In some examples, the model trainer 150 quantizes the weights 202 and the activations 204 per the same fixed-bit width 162 (e.g., 4-bit or 8-bit). In other examples, the model trainer 150 quantizes the weights 202 and the activations using different fixed-bit widths 162. For instance, the model trainer 150 quantizes the activations 204 with a fixed-bit width 162 that is greater than a fixed-bit width 162 for the weights 202 (e.g., 4-bit for weights 202 and 8-bit for activations 204). In yet other examples, the model trainer 150 quantizes the weights 202 and does not quantize the activations 204 (e.g., the activations 204 are represented by a float value such as a float32).

The model trainer 150 may quantize only portions of the model 200. In some examples, the model trainer 150, when the model 200 includes multiple encoders and multiple decoders, only quantizes the encoders and does not quantize the decoders, as in some scenarios the memory requirements for the decoders is minimal. After training and quantization, the model trainer 150 may provide the quantized and trained model 200 to the user device 10.

Figure 2:
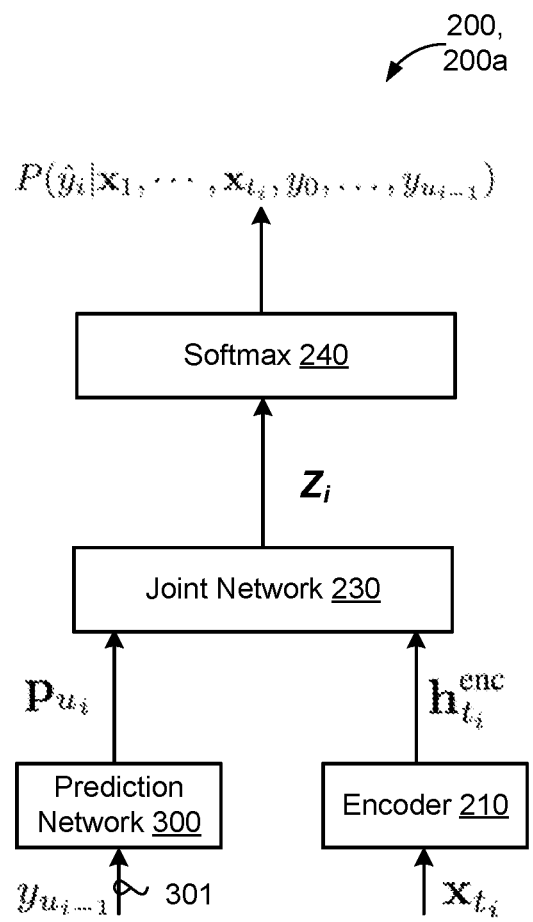
FIG. 2 is a schematic view of an example recurrent neural network-transducer (RNN-T) model for the system of FIG. 1A.

Referring now to FIG. 2, an example model 200, 200a includes a Recurrent Neural Network-Transducer (RNN-T) model architecture which adheres to latency constrains associated with interactive applications. The use of the RNN-T model architecture is exemplary, and the model 200 may include other architectures such as transformer-transducer and conformer-transducer model architectures among others. The RNN-T model 200a provides a small computational footprint and utilizes less memory requirements than conventional ASR architectures, making the RNN-T model architecture suitable for performing speech recognition entirely on the user device 10 (e.g., no communication with a remote server is required). In this example, the RNN-T model 200a includes an encoder network 210, a prediction network 300, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder reads a sequence of d-dimensional feature vectors (e.g., acoustic frames) $x=(x_1, x_2, \ldots, x_T)$, where $x_T \in \mathbb{R}^d$, and produces at each output step a higher-order feature representation. This higher-order feature representation is denoted as $h_1^{enc}, \ldots, h_T^{enc}$.

Similarly, the prediction network 300 may also be an LSTM network, which, like a language model (LM), processes the sequence of non-blank symbols output by a final Softmax layer 240 so far, $y_0, \ldots, y_{ui-1}$, into a dense representation $P_{ui}$. Finally, with the RNN-T model architecture, the representations produced by the encoder and prediction/decoder networks 210, 300 are combined by the joint network 230. The prediction network 300 may be replaced by an embedding look-up table to improve latency by outputting looked-up sparse embeddings in lieu of processing dense representations. The joint network then predicts $P(y_i | x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., audio encoder) 210 of the RNN-T model 200 includes a stack of multi-head attention layers or self-attention layers/blocks, such as one or more conformer blocks/layers and/or one or more transformer blocks/layers. Optionally, the encoder 210 (i.e., the audio encoder) includes a first pass causal encoder and a second pass non-causal encoder for a multi-pass architecture. This multi-pass model unifies the streaming and non-streaming ASRs, where the causal encoder uses only left context and produces partial results with minimal latency, and the non-causal encoder can provide more accurate hypothesis by using both left and right context. In this example, each conformer block includes a series of multi-headed self attention, depth wise convolution, and feed-forward layers. The prediction network 300 may have two 2,048-dimensional LSTM layers, each of which is also followed by 640-dimensional projection layer. Alternatively, the prediction network 300 may include a stack of transformer or conformer blocks, or an embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Figure 3:
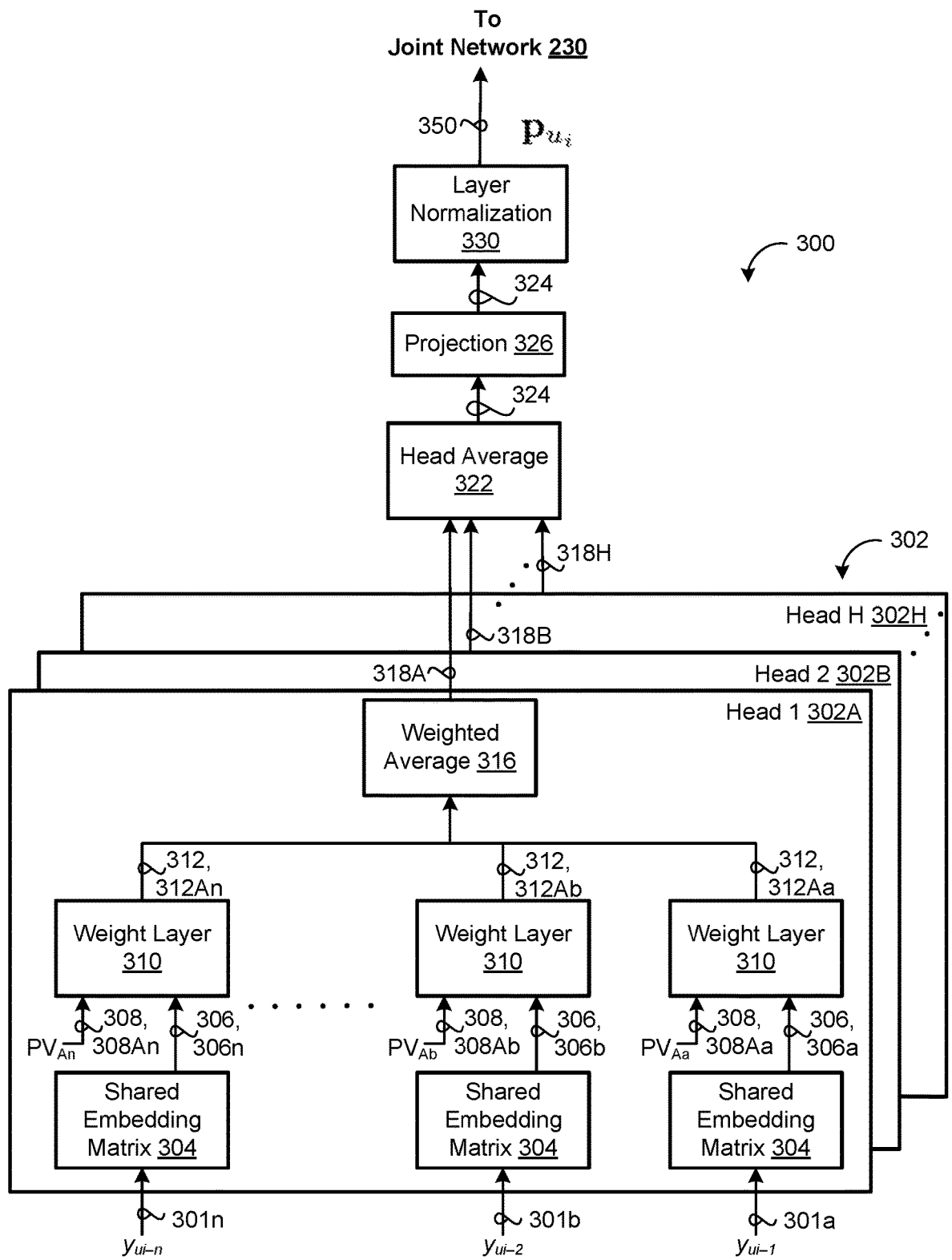
FIG. 3 is a schematic view of an example prediction network of the RNN-T model of FIG. 2.

FIG. 3 illustrates an exemplary prediction network 300 of the RNN-T model 200a receiving, as input, a sequence of non-blank symbols $y_{ui-n}, \ldots, y_{ui-1}$ that is limited to the N previous non-blank symbols 301a—n output by the final Softmax layer 240. In some examples, N is equal to two. In other examples, N is equal to five, however, the disclosure is non-limiting and N may equal any integer. The sequence of non-blank symbols 301a—n indicates an initial speech recognition result 120a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 301 among the sequence of non-blank symbols $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{ui-n}, \ldots, y_{ui-1}$. The respective position vector PV 308 assigned to each non-blank symbol indicates a position in the history of the sequence of non-blank symbols (e.g., the N previous non-blank symbols output by the final Softmax layer 240). For instance, the first position vector $PV_{Aa}$ is assigned to a most recent position in the history, while the last position vector PVAn is assigned to a last position in the history of the N previous non-blank symbols output by the final Softmax layer 240. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 301a-n, $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $308_{Ba-Bn}, \ldots$, and the $H^{th}$ head 302 H defines another different row of position vectors $PV_{Ha-Hn}$ $308_{Ha-Hn}$.

For each non-blank symbol in the sequence of non-blank symbols 301a—n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N} \sum_{h,n} X_n * \sum_e (X_{n,e} * P_{h,n,e}) \quad (1)$$

In Equation 1, h represents the index of the heads 302, n represents position in context, and e represents the embedding dimension. Additionally, in Equation 1, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $Pu_i$ 350 at the corresponding time step from the plurality of time steps. The prediction network 300 generates only a single embedding vector $Pu_i$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector Pth 350.

In some implementations, to further reduce the size of the RNN-T decoder, i.e., the prediction network 300 and the joint network 230, parameter tying between the prediction network 300 and the joint network 230 is applied. Specifically, for a vocabulary size V and an embedding dimension $d_e$, the shared embedding matrix 304 at the prediction network is $E \in \mathbb{R}^{V \times d_e}$. Meanwhile, a last hidden layer includes a dimension size $d_h$ at the joint network 230, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 230 includes a weight matrix $[d_h, |V|]$. By having the prediction network 300 to tie the size of the embedding dimension $d_e$ to the dimensionality $d_h$ of the last hidden layer of the joint network 230, the feed-forward projection weights of the joint network 230 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$ equal to the size of the hidden layer dimension $d_h$, the RNN-T decoder reduces a number of parameters equal to the product of the embedding dimension $d_e$ and the vocabulary size V. This weight tying corresponds to a regularization technique.

Referring now to FIG. 4, an algorithm 400 illustrates native quantization for an 8-bit integer (int8) in TensorFlow. Using the algorithm 400, the model trainer 150, during training, determines the scale factor 160 by first estimating a max value over an axis to be quantized (as the algorithm 400 supports channel-wise quantization). Next, model trainer 150 determines the scale factor 160 by dividing the max values by an integer representation value 410 (i.e., 127.0 in this example). The integer representation value 410 is based on the desired integer fixed-bit width 162. That is, the scale factor 160 is based on the estimated max value of the axis to be quantized and the target fixed-bit width 162. For example, for 8-bit quantization (i.e., an integer fixed-bit width of 8), the integer representation value 410 is 127.0. As another example, for 4-bit quantization (i.e., an integer fixed-bit width of 4), the integer representation value is 4.0.

After determining the scale factor 160, the model trainer 150 quantizes the input tensor by dividing by the scale factor 160 and casting to an integer. De-quantization may be employed by multiplying a tensor by the scale factor 160.

Figure 5:
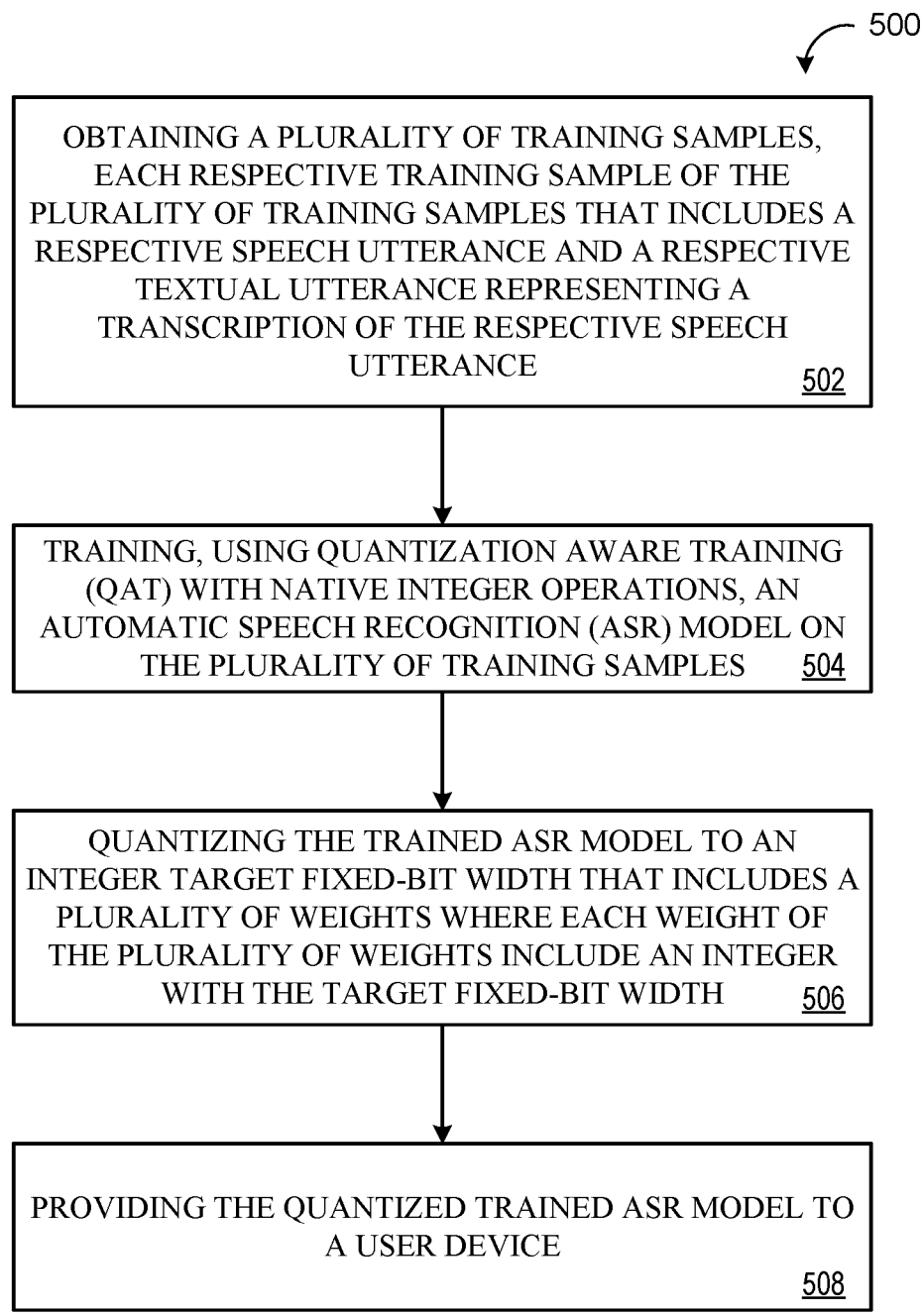
FIG. 5 a flowchart of an example arrangement of operations for a method of training an automatic speech recognition (ASR) model.

FIG. 5 is a flowchart of an exemplary arrangement of operations for a method 500 of training an ASR model 200. The method 500, at operation 502, includes obtaining a plurality of training samples 152. Each respective training sample 152 of the plurality of training samples 152 includes a respective speech utterance 154 and a respective textual utterance 156 representing a transcription of the respective speech utterance 154. The method 500, at operation 504, includes training, using quantization aware training with native integer operations, an automatic speech recognition (ASR) model 200 on the plurality of training samples 152. At operation 506, the method 500 includes quantizing the trained ASR model 200 to an integer target fixed-bit width 162. The quantized trained ASR model 200 includes a plurality of weights 202. Each weight 202 of the plurality of weights 202 includes an integer with the target fixed-bit width 162. At operation 508, the method 500 includes providing the quantized trained ASR model 200 to a user device 10.

Figure 6:
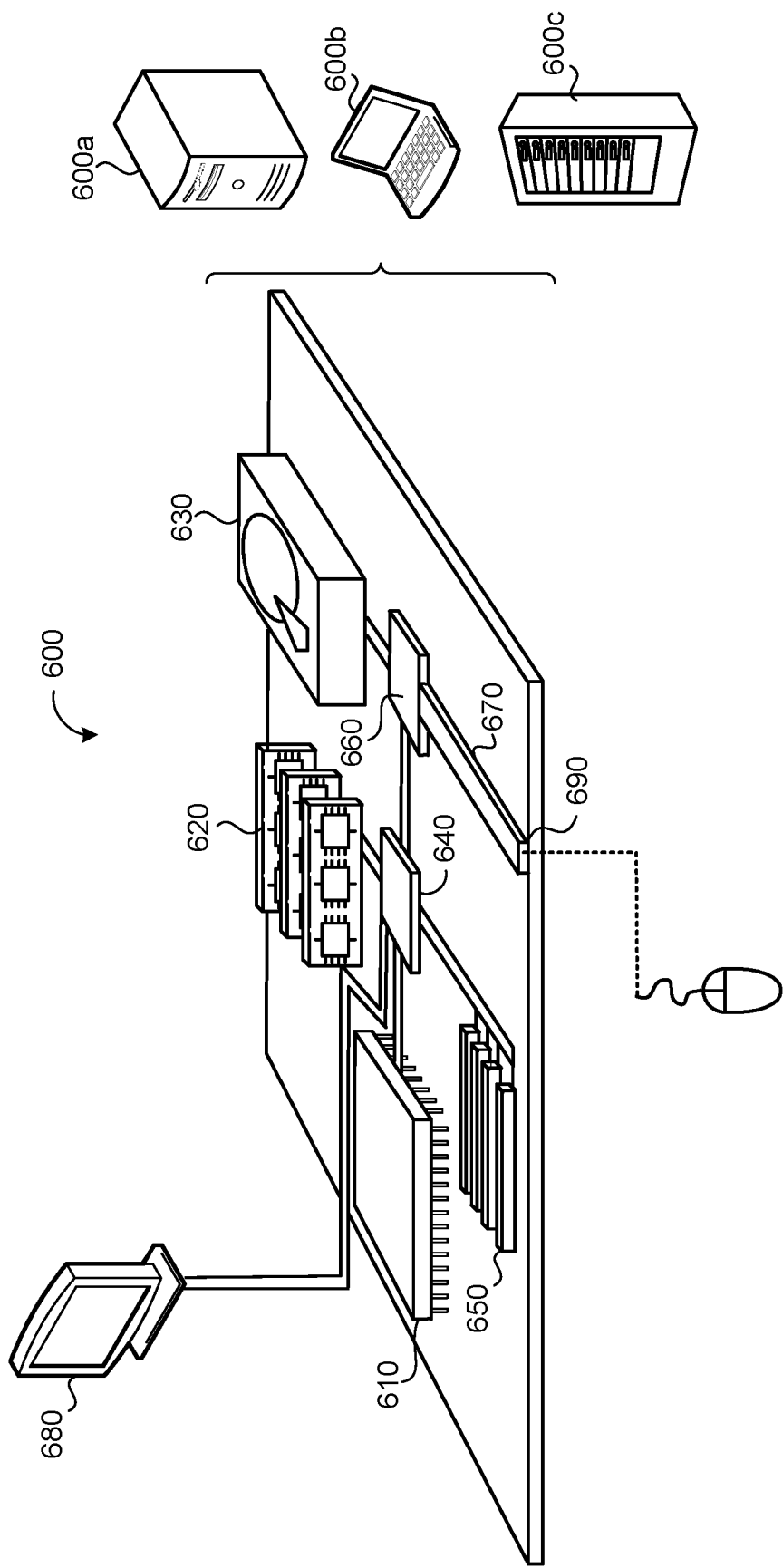
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    obtaining a plurality of training samples, each respective training sample of the plurality of training samples comprising:
        a respective speech utterance; and
        a respective textual utterance representing a transcription of the respective speech utterance;
    training, using quantization aware training with native integer operations, an automatic speech recognition (ASR) model on the plurality of training samples;
    quantizing the trained ASR model to an integer target fixed-bit width, the quantized trained ASR model comprising a plurality of weights, each weight of the plurality of weights comprising an integer with the target fixed-bit width; and
    providing the quantized trained ASR model to a user device.

2. The method of claim 1, wherein the target fixed-bit width is four.

3. The method of claim 1, wherein the ASR model further comprises a plurality of activations, each activation of the plurality of activations comprising an integer with the target fixed-bit width.

4. The method of claim 1, wherein the ASR model further comprises a plurality of activations, each activation of the plurality of activations comprising an integer with a fixed bit width greater than the target fixed-bit width.

5. The method of claim 1, wherein the ASR model further comprises a plurality of activations, each activation of the plurality of activations comprising a float value.

6. The method of claim 1, wherein quantizing the trained ASR model comprises determining a scale factor based on an estimated max value of an axis to be quantized and the target fixed-bit width.

7. The method of claim 1, wherein the ASR model comprises one or more multi-head attention layers.

8. The method of claim 7, wherein the one or more multi-head attention layers comprise one or more conformer layers or one or more transformer layers.

9. The method of claim 1, wherein:
    the ASR model comprises a plurality of encoders and a plurality of decoders; and
    quantizing the ASR model comprises quantizing the plurality of encoders and not quantizing the plurality of decoders.

10. The method of claim 1, wherein:
    the ASR model comprises an audio encoder; and
    the audio encoder comprises a cascaded encoder comprising a first causal encoder and a second non-causal encoder.

11. A system comprising:
    data processing hardware; and
    memory hardware in communication with the data processing hardware, the memory hardware storing instructions that when executed on the data processing hardware cause the data processing hardware to perform operations comprising:
        obtaining a plurality of training samples, each respective training sample of the plurality of training samples comprising:

a respective speech utterance; and a respective textual utterance representing a transcription of the respective speech utterance;

training, using quantization aware training with native integer operations, an automatic speech recognition (ASR) model on the plurality of training samples;

quantizing the trained ASR model to an integer target fixed-bit width, the quantized trained ASR model comprising a plurality of weights, each weight of the plurality of weights comprising an integer with the target fixed-bit width; and providing the quantized trained ASR model to a user device.

12. The system of claim 11, wherein the target fixed-bit width is four.

13. The system of claim 11, wherein the ASR model further comprises a plurality of activations, each activation of the plurality of activations comprising an integer with the target fixed-bit width.

14. The system of claim 11, wherein the ASR model further comprises a plurality of activations, each activation of the plurality of activations comprising an integer with a fixed bit width greater than the target fixed-bit width.

15. The system of claim 11, wherein the ASR model further comprises a plurality of activations, each activation of the plurality of activations comprising a float value.

16. The system of claim 11, wherein quantizing the trained ASR model comprises determining a scale factor based on an estimated max value of an axis to be quantized and the target fixed-bit width.

17. The system of claim 11, wherein the ASR model comprises one or more multi-head attention layers.

18. The system of claim 17, wherein the one or more multi-head attention layers comprise one or more conformer layers or one or more transformer layers.

19. The system of claim 11, wherein:

the ASR model comprises a plurality of encoders and a plurality of decoders; and quantizing the ASR model comprises quantizing the plurality of encoders and not quantizing the plurality of decoders.

20. The system of claim 11, wherein:

the ASR model comprises an audio encoder; and the audio encoder comprises a cascaded encoder comprising a first causal encoder and a second non-causal encoder.

* * * * *